(12) United States Patent
Spiess et al.

(10) Patent No.: US 7,926,719 B2
(45) Date of Patent: Apr. 19, 2011

(54) ELECTRONIC CIRCUIT FOR A CONTACTLESS READER DEVICE

(75) Inventors: Bernhard Spiess, Graz (AT); Pamir Erdeniz, Graz (AT); Michael Zenz, Deutschfeistritz (AT)

(73) Assignee: NXP B.V., Eindhoven (NL)

( * ) Notice: Subject to any disclaimer, the term of this patent is extended or adjusted under 35 U.S.C. 154(b) by 421 days.

(21) Appl. No.: 12/090,012

(22) PCT Filed: Oct. 16, 2006

(86) PCT No.: PCT/IB2006/053797
§ 371 (c)(1),
(2), (4) Date: Apr. 11, 2008

(87) PCT Pub. No.: WO2007/046053
PCT Pub. Date: Apr. 26, 2007

(65) Prior Publication Data
US 2008/0223931 A1 Sep. 18, 2008

(30) Foreign Application Priority Data

Oct. 17, 2005 (EP) ..................................... 05109621

(51) Int. Cl.
*G06K 7/00* (2006.01)
(52) U.S. Cl. ...................................................... 235/439
(58) Field of Classification Search .................. 235/439; 375/219
See application file for complete search history.

(56) References Cited

U.S. PATENT DOCUMENTS 5,619,529 A 4/1997 Fujioka
7,602,274 B2 * 10/2009 Lee et al. ..................... 340/10.2

FOREIGN PATENT DOCUMENTS

| EP | 1713185 A1 | 10/2006 |
|---|---|---|
| WO | 9943096 A1 | 8/1999 |
| WO | 2005074158 A1 | 8/2005 |

* cited by examiner

*Primary Examiner* — Daniel A Hess

(57) ABSTRACT

An electronic circuit (12, 12') for a reader device (10, 10') for contactless communication with a transponder (20) is disclosed. The electronic circuit (12, 12') comprises a connection (13*a*, 13*b*) to an antenna (11) of said reader device (10, 10'), which antenna (11) is designed for receiving a radio signal (TRS) from said transponder (20). Furthermore, it comprises a receiving module (14), which is connected to the antenna connection (13*a*, 13*b*) and arranged for processing an input voltage (VI) from said antenna (11) representing said radio signal (TRS). To provide satisfactory operation of the receiving module (14) and to compensate a bad matching of the antenna circuit to the electronic circuit (12, 12') and/or bad environmental conditions where the reader device (10, 10') is operated, the electronic circuit furthermore comprises a control module (15, 15'). Said control module (15, 15') is arranged to compare said input voltage (VI) to a reference value (VR) and to adjust a plant of said reader device (10, 10') in such a manner that the level of said input voltage (VI) stays in a predefined range. The invention furthermore relates to a reader device (10, 10') and a method of operating a reader device (10, 10').

10 Claims, 3 Drawing Sheets

ELECTRONIC CIRCUIT FOR A CONTACTLESS READER DEVICE

FIELD OF THE INVENTION

The invention relates to an electronic circuit for a reader device, which reader device is designed for contactless communication with a transponder, the circuit comprising a connection to an antenna of said reader device, which antenna is designed for receiving a radio signal from said transponder, and comprising a receiving module connected to the antenna connection and arranged for processing an input voltage from said antenna representing said radio signal.

The invention furthermore relates to a reader device designed for contactless communication with a transponder, comprising an inventive electronic circuit and an antenna connected thereto, and finally to a method of controlling a range of an input voltage of a receiving module comprised by a reader device, which reader device is designed for contactless communication with a transponder.

BACKGROUND OF THE INVENTION

Contactless reader devices as defined in the opening paragraph are broadly used nowadays, in particular in the service sector, in the field of logistics, in the field of commerce and in the field of industrial production. Examples, which are more based on a smart card, are access systems for buildings and offices, payment systems as well as smart cards for identifying individuals (e.g. passport). Examples, which are more based on the so-called RFID tags, are systems for identification/pricing of objects and products, animal tagging, and paper with an RFID tag inside. It will of course be appreciated that the examples above just show a small segment of the numerous applications and are just for illustrating what smart cards and RFID tags are used for. In addition, the upcoming technology of Near Field Communication, NFC for short, also applies to the same technical field. In the following, RFID tags and smart cards, as well as NFC devices, which are in the passive mode, are generally referred to as transponders.

For all these systems, reader devices are needed (not mandatory for NFC as the devices may also act as readers), which reader devices are to communicate with transponders within the radio range. Therefore, a reader device sends out radio signals, which can comprise commands or data and which can be received by a transponder. In addition, data and commands can be sent back to the reader by the transponder. Transponders include passive and active transponders. In the case of a passive transponder, the transponder also uses the energy of the electromagnetic field to power itself, whereas active transponders have their own power source, e.g. a battery. Furthermore, different kinds of coupling between a reader device and a transponder can be distinguished, such as inductive coupling, electromagnetic backscatter coupling, close coupling and electrical coupling. Finally, the various systems operate in different frequency ranges, starting from some kHz up to several GHz. For the sake of brevity, in the following reference is only made to general system characteristics and—where appropriate—to special system characteristics, e.g. to inductively coupled systems or to the concept of load modulation in inductively coupled systems. However, one will easily perceive that the object of the invention and the measures taken to achieve this object are applicable to all kinds of identification systems.

One problem which is to be overcome when designing a reader device relates to the question how to handle different boundary conditions of the systems, that is to say: varying distances between reader device and transponder, varying environmental conditions (disturbing objects in the radio range), and last but not least different design guidelines, which could mean that the developer has to use a special electric reader circuit with a special antenna.

There are some examples in the prior art, which show different approaches. One of them is disclosed in WO 99/43096, "Data communications terminal and method of adjusting a power signal generated therefrom", dated Aug. 26, 1999.. Here, a data communications terminal includes an antenna circuit for delivering a power signal to a portable data device. The terminal further encompasses a method of automatically adjusting the power seen by the portable data device without any communications feedback from the portable data device by monitoring an impedance characteristic for the antenna circuit. When a change in the monitored impedance characteristics is detected, the data communication terminal adjusts the power level for the power signal delivered to the portable data device.

WO 99/43096. discloses that the controlled variable is the current through the antenna of a reading device or the antenna's impedance. The plant (controlled system) includes the output amplifiers and the set value is the supply voltage of the output amplifiers. With this system, varying distances between reading device and transponder can be compensated, thus avoiding damage to a transponder through heating it up when the distance gets smaller, and avoiding loss of transmitted data when the distance gets larger. However, WO 99/43096. fails to deal with the input stage of a reading device. Hence, it is an object of the invention to avoid damage to the input stage of a reading device and in particular to provide optimum operation of said input stage.

OBJECT AND SUMMARY OF THE INVENTION

The object of the invention is achieved by an electric circuit as defined in the opening paragraph, additionally comprising a control module which is arranged to compare said input voltage to a reference value and to adjust a plant of said reader device in such a way that the level of said input voltage stays in a predefined range.

The object of the invention is furthermore achieved by a reader device designed for contactless communication with a transponder, comprising an inventive electronic circuit and an antenna connected thereto.

The object of the invention finally is achieved by a method of controlling a range of an input voltage of a receiving module comprised by a reader device, which reader device is designed for contactless communication with a transponder, comprising the steps of:
  comparing said input voltage to a reference value and
  adjusting a plant of said reader device in such a way that the
    level of said input voltage stays in a predefined range.

The above-stated measures provide the advantage that the receiving module can operate in an optimum operating range although the matching between electric circuit and antenna circuit as well as the environmental conditions around the reading device may vary.

In an advantageous embodiment of the invention, an adjustable damping element is arranged between said receiving module and said antenna connection, and said control module is arranged to compare said input voltage to a reference value and to adjust said damping element accordingly. Quite often it is necessary to downscale the antenna voltage, which may reach amplitudes up to 100V, to a level which is feasible for the receiving module. Dependent on the technology used, the input voltage should be in the range of some volts. As a damping element in principle is comprised in the reader devices currently used, the invention can be realized in a relatively simple manner by exchanging the existing damping element (which generally is a voltage divider) for an adjustable damping element, e.g. a (digitally controlled) potentiometer.

In a further advantageous embodiment of the invention, an adjustable amplifier is arranged to drive said antenna and said control module is arranged to compare said input voltage to a reference value and to adjust said amplifier accordingly. A reader device usually comprises (power) amplifiers to drive the antenna and to provide a signal amplitude up to 100V. Since the amplifiers already exist in common reader designs, comparatively little effort is required to put the invention into practice. To do so, the amplifiers are exchanged for amplifiers with an additional input for gain adjust or, if the output amplifiers are operated in saturation (which is the case quite often), simply the supply voltage of the amplifiers is adjusted.

In a very advantageous embodiment of the invention, an adjustable damping element is arranged between said receiving module and said antenna connection, an adjustable amplifier is arranged to drive said antenna, and said control module is arranged to compare said input voltage to a reference value and to adjust said damping element and said amplifier accordingly. Here, both methods, which were presented before, are combined, thus providing an increased degree of freedom. Furthermore, a greater variation of the disturbing parameters, that is to say a poor matching of the antenna circuit as well as unfavorable environmental conditions, may be compensated due to the additional effect of both possibilities of adjustment.

In yet another beneficial embodiment, the plant(s) of the reader device is (are) set to a start value, to adjust said plant(s) step by step in such a way that the level of the input voltage increases and to stop the adjustment when a predefined level of the input voltage is reached. Here, starting at the low side, the antenna voltage and, in turn, the input voltage are increased, thus preventing damage to the sensitive receiving module. However, it is also imaginable to start at the upper side and adjust said plant(s) step by step in such a way that the level of the input voltage decreases. When the optimum level is reached, the sequence is stopped, as satisfactory operation of the receiving module is obtained. The final adjustment can also be stored in a memory of the electric circuit for later use, e.g. for a later power-up of the reader device. The control module used therefore preferably comprises a microprocessor or a state machine.

Furthermore, it is also beneficial if one adjusting step is reversed when a certain level of the input voltage is reached. Under certain circumstances it might be useful to be a little bit more on the safe side with respect to the input voltage of the receiving module. Hence, the first adjustment, which causes the input voltage to exceed said predefined level, is reversed, so that the reader device subsequently operates just below said predefined level. Again, it is imaginable to start at the upper side. In this case, the reader device subsequently operates just above said predefined level. Furthermore, it is again imaginable that the final adjustment is stored for later use.

It is further beneficial to use the last adjustment if a predefined level cannot be reached. Here, the best possible adjustment is used for the further operation of the reader device, since the target range cannot be reached. This may be attributable to the antenna circuit being very poorly matched to the electric circuit, or the reader device operating in very unfavorable environmental conditions.

Finally, it is also beneficial if the control module comprises a continuous controller. One example of such a controller is a standard PID-controller, where the proportional, integral and differential share of the control mechanism can be set independently. As the processing of the control sequence usually is not time critical, a P-controller or a PI-controller can be used.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
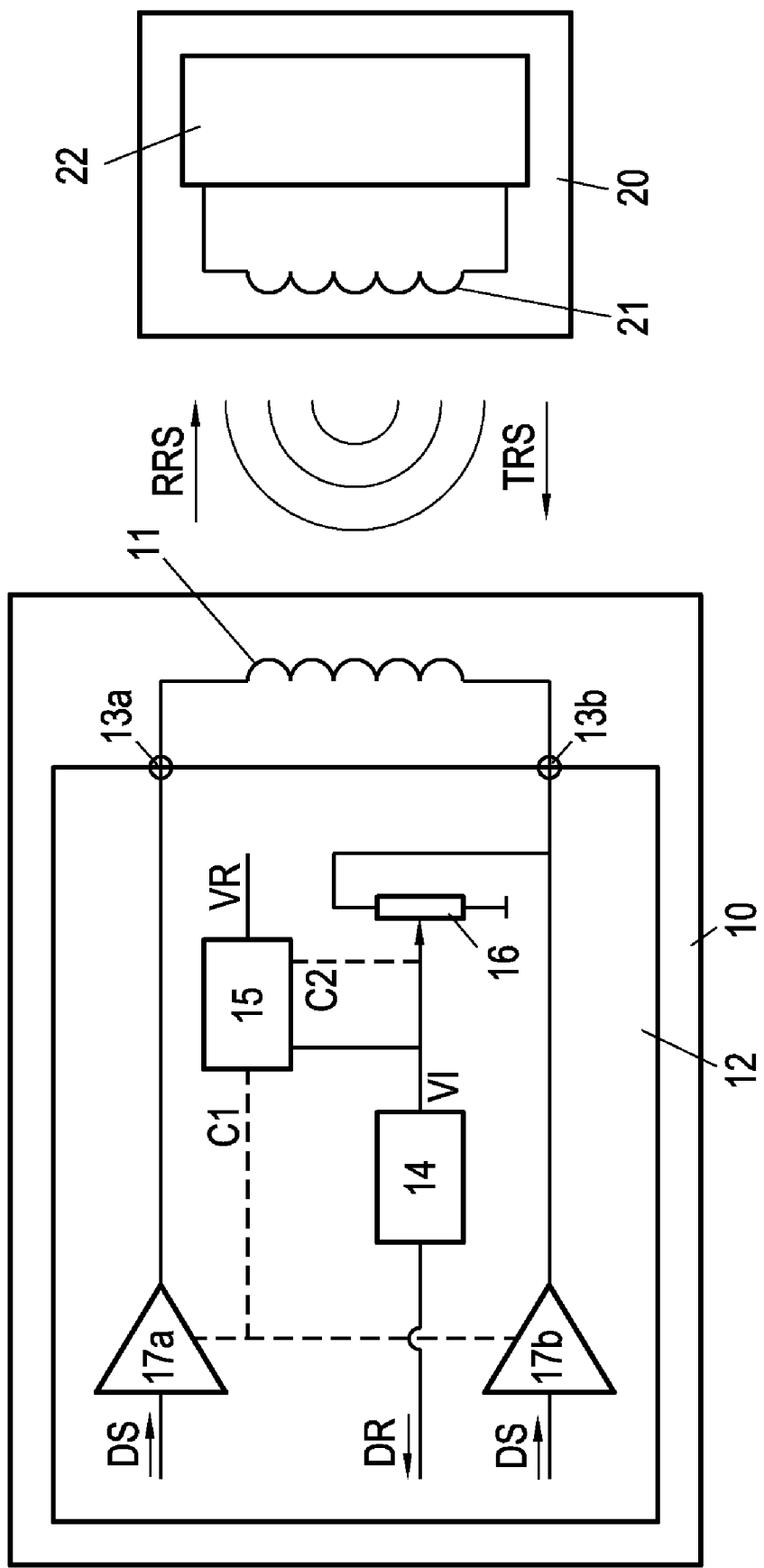
FIG. 1 shows an inventive reader device in communication with a transponder.

FIG. 1 shows a reader device 10 in communication with a transponder 20, which transponder 20 comprises a transponder antenna 21 and a transponder circuit 22. Accordingly, the reader device 10 comprises an antenna 11 and an electronic circuit 12. The electronic circuit 12 itself is connected to the antenna 11 by means of connections 13a, 13b. Inside the electronic circuit 12 there are a receiving module 14, a control module 15, a damping element 16 and a first and a second amplifier 17a, 17b. The first connection 13a is connected with an output of the first amplifier 17a. Accordingly, the second connection 13b is connected with an output of the second amplifier 17b. In addition, the second connection 13b is connected with an input of the receiving module 14, with the damping element 16 being arranged in-between. The input of the receiving module 14 is furthermore connected to an input of the control module 15. Outputs of the control module 15 are shown in dashed form. One output is connected to the amplifiers, another one to the damping element 16.

It should be noted that only those elements of a reader device are shown which are necessary to explain the invention. Additionally, the Figures do not show a complete electric circuit, but rather an arrangement of functional entities with functional connections.

The arrangement shown in FIG. 1 functions as follows. A data signal DS is applied to the inputs of the amplifiers 17a and 17b. This data signal DS is amplified (using opposite polarities) and fed into the antenna 11 via the connections 13a, 13b. The antenna then transmits a reader radio signal RRS according to the data signal DS to the transponder 20 where it is received by means of the transponder antenna 21 and transformed into a data signal again within the transponder circuit 20. In the case of a passive transponder, the transponder 20 also uses the energy of the electromagnetic field to power itself, whereas active transponders have their own power source, e.g. a battery. As a result of the received data signal 20, the transponder 20 sends a transponder radio signal TRS back to the reader device 10. In the present example, which refers to inductively coupled systems, this is done by load modulating the electromagnetic field emitted by the reader device 10. But it has to be noted that the invention is applicable to other radio systems in an equivalent way, in particular to electromagnetic backscatter coupling, close coupling and electrical coupling systems. The transponder radio signal TRS is now detected at the reader device 10. For this purpose the transponder radio signal TRS is received via the antenna 11, which passes the signal to the receiving module 14, which in turn transforms it into a stream of received data DR. This received data DR subsequently may be processed by a microprocessor (not shown).

The receiving module 14 detects the different bits within the transponder radio signal TRS by evaluating variations of the antenna voltage. When the transponder 20 transfers digital data, it load-modulates the field, which means that the transponder circuit 22 short-circuits the transponder antenna 21. This causes a voltage drop in the reader antenna 11 which voltage drop in turn can be detected by the receiving module 14. One can easily imagine that these voltage drops are comparatively small and, in addition, vary with the distance between reader device 10 and transponder 20. For a satisfactory operation of the receiving module 14, it is advantageous if the level of the input voltage VI stays in a predefined range. In other words, the amplitude of the antenna voltage of the reading device 10 in modulated and unmodulated cases should stay in a predefined range. As the voltage drop caused by load modulation is comparatively small, it is also possible to simply say that the input voltage VI in the unmodulated case should have a certain amplitude. The input voltage VI depends firstly on the output power of the amplifiers 17a, 17b, secondly on the design of the antenna circuit, and thirdly on environmental conditions, that is to say objects within the radio range of the reading device, which influence the electromagnetic field, in particular objects made of metal. Therefore, the input voltage VI cannot be kept in a favorable range without additional measures being taken. Three of them are presented in the following:

a) Controlling the gain of the amplifiers 17a, 17b: As stated above, the output power of the reader device 10 depends on the output power of the amplifiers 17a, 17b, but also on the matching of the antenna circuit to the electric circuit 12. As much power as possible is transferred from the electric circuit 12 to the antenna circuit (which consists solely of the antenna 11 in FIG. 1) when both impedances are matched, which means that the impedance of the electric circuit 12 should be the conjugate complex of the impedance of the antenna circuit. Usually capacitors (see 18a and 18b in FIG. 2) are used to provide this condition, in order to compensate the inductance of the antenna 11, since the electric circuit 12 normally tends to be slightly more capacitive. As a result, the antenna circuit gets into the resonant state at the carrier frequency of the reader device 10. However, matching the antenna circuit to the electric circuit 12 is not an easy task, as different electric circuits 12 themselves may vary and antennas also have other boundary conditions. Moreover, the assembling of a reader device 10 is often done by another manufacturer than the one who produces the electric circuit 12. Hence, often deeper insight into the behavior of the electric circuit 12 is not available to the reader's assembler. In addition, as stated above, also environmental conditions of the reader device 10 influence the output power of the antenna 11. As a worst case, one can imagine an electromagnetic shield nearby the reader device 10. Hence, one will certainly appreciate that a poorly matched antenna 11 and unfavorable environmental conditions lead to a decrease of the level of the input voltage VI. To ensure satisfactory operation of the receiving module 14 according to the invention, the gain of the amplifiers 17a, 17b is adjusted accordingly, meaning that it is increased when the level of the input voltage VI decreases, thus compensating a poorly matched antenna 11 and/or environmental conditions for transmitting radio waves on the transmitting path. Therefore, the input voltage VI as well as a reference voltage VR are fed into the control module 15, which supervises the input voltage VI and, dependent on its level compared to the reference voltage VR, increases or decreases the gain of the amplifiers 17a and 17b by means of a first control signal C1 (dashed line). In general, the amplifiers are operated in saturation, so that increasing the gain may simply be done by increasing the supply voltage of the amplifiers 17a, 17b. However, it is also imaginable that amplifiers with adjustable gain are used. In this case, the first control signal C1 is fed into the corresponding input of the amplifiers 17a and 17b. Note that for the considerations given above, it was presumed that the adjustment of the damping element 16 is held constant, and thus does not influence the input voltage VI of the receiving module 14. Accordingly, the second control signal C2 as well as the corresponding output of the control module 15 may be omitted.

Figure 3:
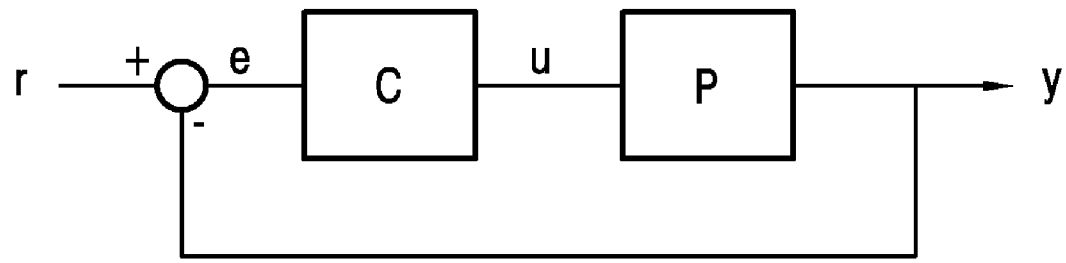
FIG. 3 shows a standard control loop.

In terms of control engineering (also see FIG. 3, which shows a standard control loop), this means that the reference voltage VR acts as a reference value r for a control loop and the input voltage VI as a control variable y of the system. Accordingly, the difference between the reference voltage VR and the input voltage VI is the error e, which is fed into the controller C. Finally, the amplifiers 17a and 17b are the plant P of the control loop and the first control signal C1 acts as a set value u for the control loop. The control module 15 comprises the controller C of the control loop as well as the summation point.

b) Controlling the damping by the damping element 16: Between antenna 11 and the receiving module there is a damping element 16, in the present case a variable resistor or potentiometer. Dependent on the adjustment, this damping element 16 dampens the antenna voltage to a smaller or greater degree, so that one will appreciate that the input voltage VI for the receiving module 14 depends on the antenna voltage as well as on the adjustment of the damping element 16. As stated before, the level of the input voltage VI should stay in a predefined range for a satisfactory operation of the receiving module 14. To ensure this, according to the invention, the damping by the damping element 16 is adjusted accordingly, which means that the damping is decreased when the level of the input voltage VI decreases, thus compensating a poorly matched antenna 11 and/or unfavorable environmental conditions for transmitting radio waves on the transmitting path. Therefore, the input voltage VI as well as a reference voltage VR are fed into the control module 15, which supervises the input voltage VI and, dependent on its level compared to the reference voltage VR, increases or decreases the damping by the damping element 16 by means of a second control signal C2 (dashed line). In the present example, an adjustable resistor is used as damping element 16, in particular a digitally controlled potentiometer (also referred to as DCP). Hence, the second control signal C2 is a digital value in the present case, but it should be noted that also other possibilities are imaginable. Note also that for the considerations given above, it was presumed that the gain of the amplifiers 17a and 17b was held constant, and thus does not influence the input voltage VI of the receiving module 14. Accordingly, the first control signal C1 as well as the corresponding output of the control module 15 may be omitted.

In terms of control engineering this means that the reference voltage VR again acts as a reference value r for a control loop and the input voltage VI as a control variable y of the system. Accordingly, the difference between the reference voltage VR and the input voltage VI is the error e, which is fed into the controller C. In contrast to example a), the damping element 16 is the plant P of the control loop and the second control signal C2 acts as a set value u for the control loop.

Again, the control module 15 comprises both the controller C of the control loop and the summation point.

c) Combination of a) and b): Here, the gain of the amplifiers 17a and 17b as well as the damping by the damping element 14 are controlled. Accordingly, both control signals C1 and C2 are used as shown in FIG. 1, which means that the control module 15 is a so-called two dimensional controller. Advantageously, greater variations of the level of the input voltage VI may be compensated at the expense of the more complicated design of the control module 15, because of the two degrees of freedom. In any case, care should be taken that the system remains stable, which is simplified due to the fact that both plants, the amplifiers 17a, 17b and the damping element 16 have a linear characteristic.

Figure 2:
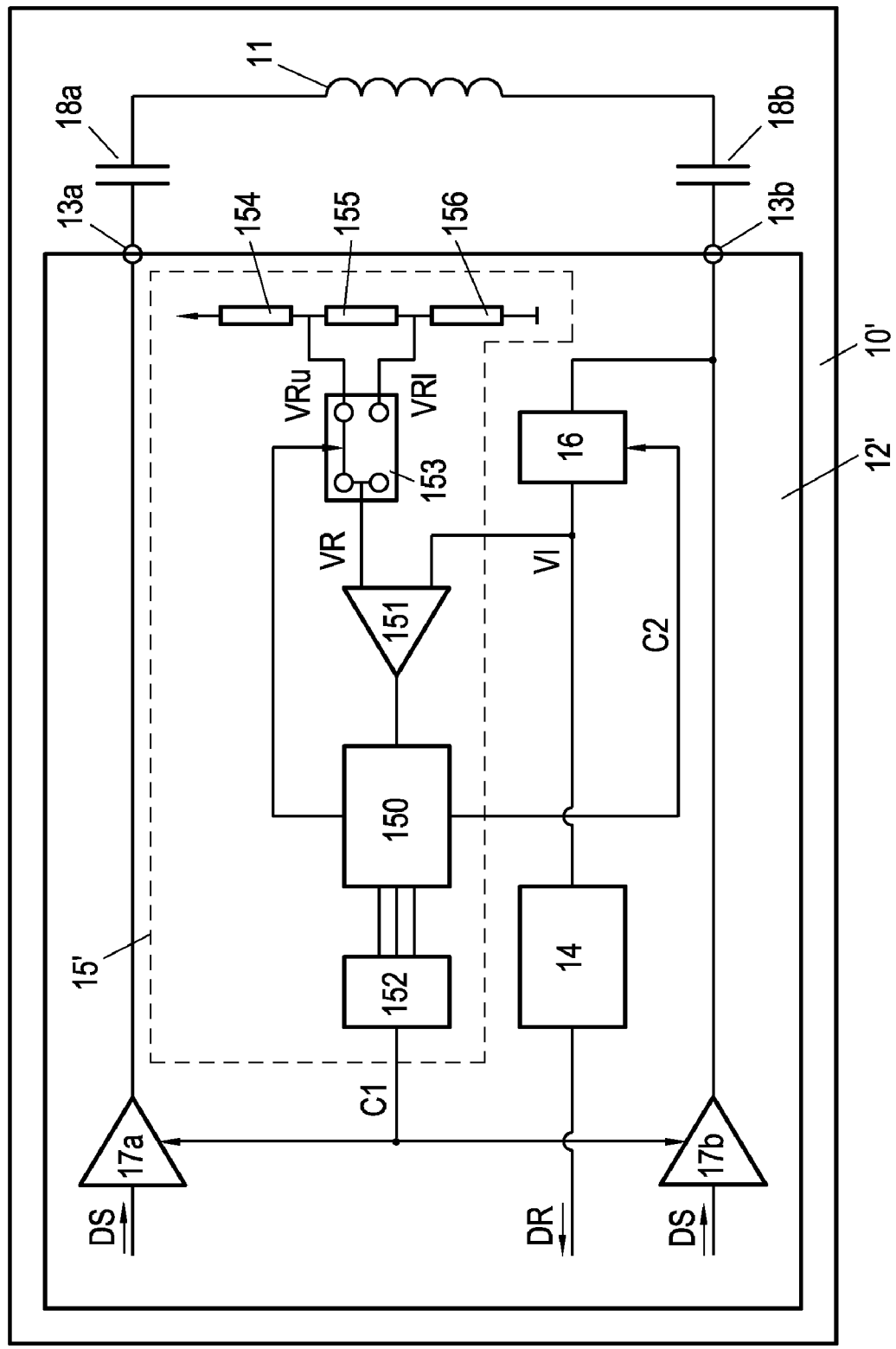
FIG. 2 shows a more detailed view of an inventive reader device.

FIG. 2 now shows a more detailed view of a further embodiment of a reader device 10'. The reader device 10' again comprises an electric circuit 12' connected to an antenna 11. In contrast to the embodiment of FIG. 1, here capacitors 18a and 18b are situated between the antenna 11 and the external contacts 13a, 13b. The configuration of the electric circuit 12' is quite similar to that of the electric circuit 12. Again a control module 15' controls the amplifiers 17a and 17b. as well as a damping element 16, which is a digitally controlled potentiometer in the present case. The control module 15' comprises a controller 150, a comparator 151, a digital to analog converter (DAC for short) 152, a switch 153, and three resistors 154 to 156. The DAC 152 has a parallel interface in this example, whereas the damping element 16 has a serial interface.

The function of the control module 15' is as follows: Again, the input voltage VI of the receiving module acts as an input for the control module 15', which input voltage VI is compared to a reference voltage VR by means of the comparator 151. Furthermore, the input voltage VI again acts as the control variable y of the control loop, whereas the reference voltage VR acts as a reference value r. Accordingly, the output of the comparator 151 represents the error e of the control loop. This error e is fed into the controller 150, which in turn calculates corresponding output values for the first control signal C1 and the second control signal C2. In the present case, the controller 150 is presumed to be a simple state machine, which increases the gain of the amplifiers 17a, 17b and decreases the damping by the damping element 16 step by step if the input voltage VI is below the reference voltage VR. In this case, the controller 15 furthermore signals to the switch 153 to switch to the second switching path, thus providing the lower reference voltage VRl provided between resistors 155 and 156. If the input voltage VI exceeds the reference voltage VR, the gain of the amplifiers 17a and 17b is decreased and the damping by the damping element 16 is increased again. At the same time, the controller signals to the switch 153 to provide the upper reference voltage VRu provided between resistors 154 and 155, that is to say to switch to the first switching path. One will of course appreciate that the switch 153 in combination with the resistors 154 to 156 provides a reference voltage VR, which is toggled between an upper and a lower reference voltage VRu and VRl. Hence, the control module 15' incorporates a hysteresis, which stabilizes the system. To avoid negative effects on the control loop due to transitions caused by the resonant circuit formed by the antenna 11 and the capacitors 18a, 18b, the controller 150 switches to the next step every 128 µs. This delay is preferably used for 13.56. MHz. However, also other delays may be used, especially when using a carrier frequency different from 13.56. MHz.

Figure 4:
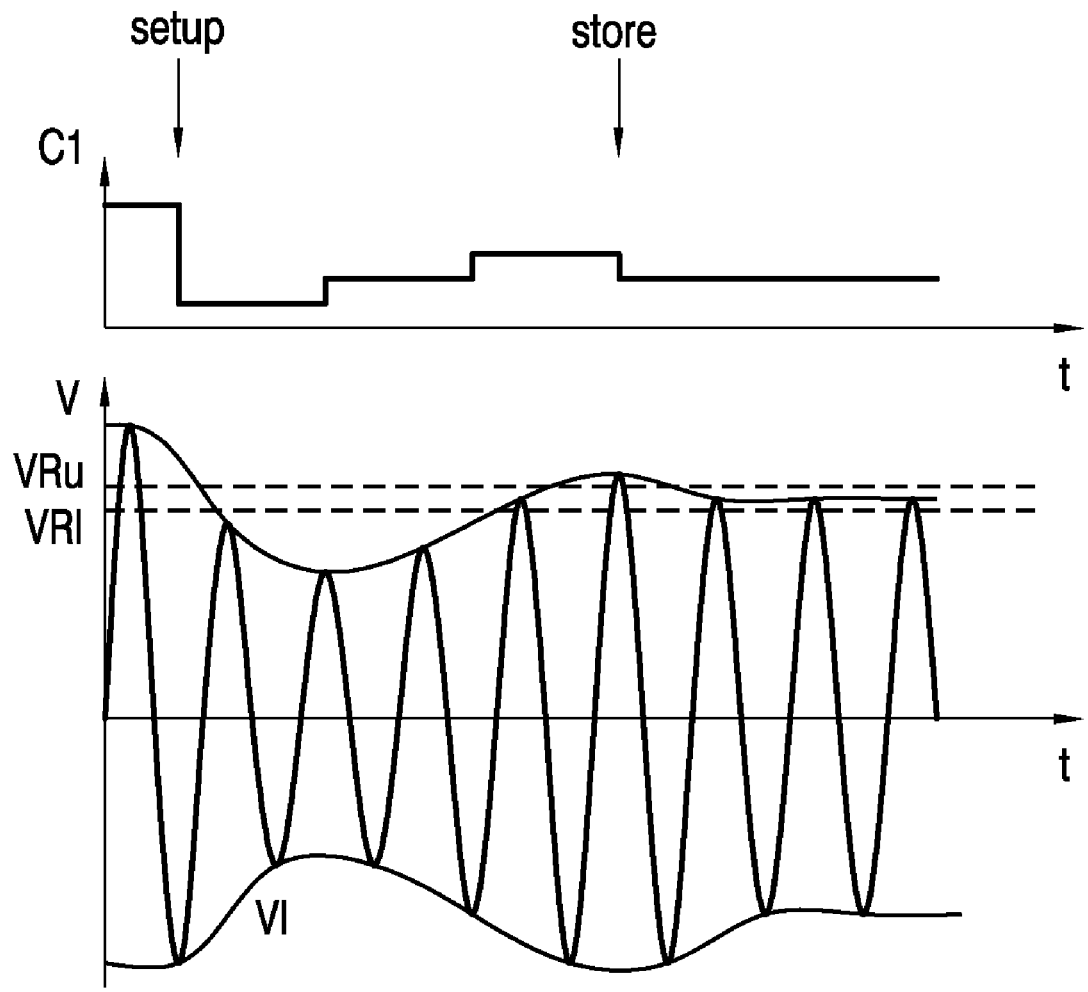
FIG. 4 shows a set-up sequence of an inventive reader device.

The entities in FIG. 2, in particular those of control module 15', again have a functional meaning rather than representing real, physical entities. Hence, the comparator 151 may be an operational amplifier as well as a digital adder (processing the negative value of the input voltage VI). Accordingly, the controller 150 may be an analog controller or a digital controller (in particular a microprocessor). The switch 153 may be a real switch or a multiplexer. It is even imaginable that the reference voltage VI is no real voltage but a digital reference value in a microcontroller. In this case, the switch 153 can be dispensed with. Two digital reference values in a memory can provide a hysteresis instead. As stated above, the DAC 152 has a parallel interface, whereas the damping element 16 has a serial interface. However, other interfaces are equally imaginable. Furthermore, a mixed design of analog and digital entities is imaginable. One only has to take care that the signals are transformed accordingly. Finally, it is outlined that the comparison of the input voltage VI and the reference voltage VR may take place in various ways. Firstly, the antenna voltage can be rectified and, therefore, a rectified input voltage VI can be compared to a DC reference voltage. And, secondly, it is advantageous if, in addition, the rectified voltage is previously filtered by a low-pass filter (see envelope in FIG. 4). Thirdly, the antenna voltage might be used as it is, meaning that an AC input voltage VI is then compared to an AC reference voltage. Here, it is necessary that both voltages have the same phase and frequency. Finally, it is also possible that an AC input voltage VI is compared to a DC reference voltage VR. Here, the comparison takes place at a certain point in time or at a certain phasing. Referring to FIG. 4, this would mean that at the maximum of the input voltage VI a sample value is taken, which takes only a comparatively short time.

It should also be noted that the control may be in operation all the time or just on demand, in particular at the time of initialization. Here, a reader device can be adapted to the environmental conditions on the site where it is installed. So, for example after fixing a reader device to the wall next to the entrance of a building, the technician presses a "set up" button. This set up function activates the inventive control mechanism, which is done as long as no optimum adjustment of the amplifiers 17a, 17b. and/or the damping element 16 has been found. As soon as an optimum operating point has been found, the procedure is stopped.

The sequence is now explained in greater detail with reference to FIG. 4. Preferably, it is started at low output powers. Hence, the supply voltage of the amplifiers 17a, 17b is decreased at the time of starting the setup sequence. FIG. 4 shows that the first control signal C1 has a corresponding step-like decrease. As a result, the output power of the antenna and, therefore, the level of the input voltage VI (see envelope of VI) decrease. After a first time interval (and hence after a transition period of the envelope of the input voltage VI), in the present case after 128 µs, the input voltage VI is compared to the reference voltage VR, at this time the lower reference voltage VRl. The control 150 detects that the input voltage VI is below the target range. Therefore, the first control signal C1 and in turn the output power of the amplifiers 17a, 17b is increased by one step. Again, the input voltage VI is below the target range after another 128 µs. Finally, the next raise of the first control signal C1 leads to an input voltage VI, which is even above the target range. Accordingly, the last step is reversed, so that finally the level of the input voltage VI remains in the target range between the upper reference voltage VRu and the lower reference voltage VRl.

It should be noted here that besides the procedure shown in FIG. 4, also the damping by the damping element 16 can be decreased step by step instead of increasing the gain of the amplifiers 17a, 17b. It is also possible, as explained already hereinbefore, to increase the gain of the amplifiers 17a, 17b and simultaneously decrease the damping by the damping element 16. A further imaginable sequence would be to first increase the gain of the amplifiers 17a, 17b and then decrease the damping by the damping element 16, and vice versa. It was also presumed for the example above that the matching of the antenna wasn't completely wrong and that the environmental conditions were not too unfavorable, so that the input voltage VI sometimes reaches the lower reference voltage VRl (and here even exceeds the upper reference voltage VRu). This is not mandatory. Hence, when a desired limit is not reached, simply the adjustment providing the highest level of the input voltage VI is used.

When the lower reference voltage VRl is exceeded, the sequence may even be interrupted if a comparatively low level for the input voltage VI is considered to be sufficient for the correct operation of the receiving module 14. A third possibility is to wait until the input voltage VI also exceeds the upper reference voltage VRu. Here, instead of going back one step as shown in FIG. 4, the adjustment can be simply accepted as it is. It can be easily understood that these examples cover just a small part of the numerous possibilities, and finding other sequences is possible without departing from the broad scope of the invention.

The values for the first control signal C1 and/or the second control signal C2 can also be stored in a memory (see step "store" in FIG. 4) of the electric circuit 12 for later use, so that the setup procedure has to be performed only once. On every power-up of the reader device 10, these values are read out and used for adjusting the amplifiers 17a, 17b and/or the damping element 16.

A further useful application of the control mechanism is the adaptation of different antenna circuits to an electric circuit 12, 12' as stated above. Hence, the present invention can also be used for easy adaptation of a single electric circuit 12, 12' to different antenna designs, for example by the assembler of a reader device 10, 10'. Again, just the "set up" sequence has to be activated.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The verb "to comprise" and its conjugations does not exclude the presence of elements or steps other than those listed in any claim or the specification as a whole. Use of the singular does not exclude the plural (and vice versa) when the sense allows. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. Electronic circuit for a reader device, which reader device is designed for contactless communication with a transponder, the electronic circuit comprising:
   a connection to an antenna of the reader device, the antenna being designed for receiving a radio signal from the transponder,
   a receiving module connected to the antenna connection and arranged for processing an input voltage from the antenna representing the radio signal, and
   a control module, which is arranged to compare the input voltage to a reference value and to adjust a plant of the reader device in such a way that the level of the input voltage stays in a predefined range
   characterized in that the control module is arranged to toggle the reference value between an upper and a lower reference value and to adjust the plant of the reader device by incorporating a hysteresis.

2. Electronic circuit as claimed in claim 1, wherein
   an adjustable damping element is arranged between the receiving module and the antenna connection, and wherein
   the control module is arranged to compare the input voltage to a reference value and to adjust the damping element accordingly.

3. Electronic circuit as claimed in claim 2.

4. Electronic circuit as claimed in claim 1, wherein
   an adjustable amplifier is arranged to drive the antenna, and wherein
   the control module is arranged to compare the input voltage to a reference value and to adjust the amplifier accordingly.

5. Reader device designed for contactless communication with a transponder, comprising an electronic circuit, according to claim 1, and an antenna connected thereto.

6. Method of controlling a range of an input voltage of a receiving module comprised by a reader device, which reader device is designed for contactless communication with a transponder, comprising:
   comparing the input voltage to a reference value, and
   adjusting a plant of the reader device in such a way that the level of the input voltage stays in a predefined range characterized in that the reference value is toggled between an upper and a lower reference value, and adjusting the plant of the reader device is carried out by incorporating a hysteresis.

7. Method as claimed in claim 6, comprising:
   comparing the input voltage to a reference value, and
   accordingly adjusting a damping element, which is arranged between the receiving module and an antenna of the reader device.

8. The method of claim 7 wherein adjusting the plant of the reader device is carried out step by step.

9. Method as claimed in claim 6, comprising:
   comparing the input voltage to a reference value, and
   accordingly adjusting an amplifier, which is arranged to drive an antenna of the reader device.

10. Method as claimed in claim 6, comprising:
    comparing the input voltage to a reference value, and
    accordingly adjusting a damping element, which is arranged between the receiving module and an antenna of the reader device, and accordingly adjusting an amplifier, which is arranged to drive an antenna of the reader device.

* * * * *